United States Patent
Ahvonen et al.

(10) Patent No.: US 7,209,458 B2
(45) Date of Patent: Apr. 24, 2007

(54) ENHANCED QOS CONTROL

(75) Inventors: Kati Ahvonen, Helsinki (FI); Ralitsa Gateva, Kirkland, WA (US); Zhi-Chun Honkasalo, Kauniainen (FI); Tuija Hurtta, Espoo (FI); Mika Kiikkilä, Espoo (FI); Aki T. Korhonen, Espoo (FI); Zheng Li, Helsinki (FI); Markku T. Mäkinen, Espoo (FI); Antti Pikkusaari, Espoo (FI); Martti Tuulos, Tampere (FI)

(73) Assignee: Nokia Corporation, Espoo (FI)

( * ) Notice: Subject to any disclaimer, the term of this patent is extended or adjusted under 35 U.S.C. 154(b) by 77 days.

(21) Appl. No.: 10/670,221

(22) Filed: Sep. 26, 2003

(65) Prior Publication Data

US 2004/0116117 A1  Jun. 17, 2004

Related U.S. Application Data

(60) Provisional application No. 60/413,877, filed on Sep. 27, 2002.

(51) Int. Cl.
*H04Q 7/00*  (2006.01)
*H04Q 7/24*  (2006.01)

(52) U.S. Cl. .................... 370/328; 370/338; 370/401

(58) Field of Classification Search ............... 370/328, 370/338, 401
See application file for complete search history.

(56) References Cited

U.S. PATENT DOCUMENTS 6,104,929 A * 8/2000 Josse et al. ............... 455/445

6,389,008 B1 * 5/2002 Lupien et al. ............. 370/352
6,628,954 B1 * 9/2003 McGowan et al. ......... 455/461

(Continued)

OTHER PUBLICATIONS

3GPP TS 23.917 V0.2.0 (Sep. 2002) 3rd Generation Partnership Project; Techinical Specificati n Group Services and System Aspects; Dynamic Policy control enhancements for end-to- nd QoS (Release 6), pp. 1-12.

(Continued)

*Primary Examiner*—Zarni Maung
*Assistant Examiner*—Van Kim T. Nguyen
(74) *Attorney, Agent, or Firm*—Squire, Sanders & Dempsey L.L.P.

(57) ABSTRACT

The invention is a method and a system for the providing of service to user equipment (UE). A method of providing services to user equipment in accordance with the invention includes providing from a database (420) to a policy decision entity (405) subscriber information regarding permitted conditions for the users to obtain the services; providing service information from at least one network or server (100), regarding service offered by the at least one network or server to the user equipment, forming policy rules at the policy decision entity based upon the subscriber information and the service information. A requesting user equipment transmits a request for service to the communications network which is processed by the policy decision entity in accordance with the policy rules to determine if the service is to be allowed and if the service is allowed characteristics of the service to be provided to the requesting user equipment and the policy enforcement entity enforces at least one characteristic of an allowed service upon the communication network to insure that the allowed service obtained by the requesting user equipment has the at least one characteristic of the allowed service.

73 Claims, 10 Drawing Sheets

U.S. PATENT DOCUMENTS

| | | | |
|---|---|---|---|
| 6,636,491 B1 * | 10/2003 | Kari et al. | 370/328 |
| 6,636,502 B1 * | 10/2003 | Lager et al. | 370/352 |
| 6,658,011 B1 * | 12/2003 | Sevanto et al. | 370/401 |
| 6,661,780 B2 * | 12/2003 | Li | 370/324 |
| 6,728,208 B1 * | 4/2004 | Puuskari | 370/230.1 |
| 6,788,676 B2 * | 9/2004 | Partanen et al. | 370/352 |
| 2002/0062379 A1 | 5/2002 | Widegren et al. | |
| 2002/0077097 A1 | 6/2002 | Mizell et al. | |
| 2002/0116384 A1 | 8/2002 | Laurila et al. | |
| 2002/0128017 A1 | 9/2002 | Virtanen | |
| 2004/0047308 A1 * | 3/2004 | Kavanagh et al. | 370/328 |

OTHER PUBLICATIONS

3GPP TS 23.917 V0.2.0 (Sep. 2002) 3$^{rd}$ Generation Partnership Project; Technical Specificati n Group Services and System Aspects; Dynamic Policy control enhancements for end-to-end QoS (Release 6), marked-up version.

3GPP TS 23.207 V5.5.0 (Sep. 2002) Technical Specification, 3$^{rd}$ Generation Partnership Project; Technical Specification Group Services and System Aspects; End-to-end Quality of Service (QoS) Concept and Architecture (Release 5), pp. 1-48.

3GPP TS 23.207 V5.1.0 (Sep. 2002) Technical Specification, 3$^{rd}$ Generation Partnership Project; Technical Specification Group Core Network; Policy Control Over Go Interface (Release 5), pp. 1-54.

"Digital Cellular Telecommunications System (Phase 2+); Universal Mobile Telecommunications System (UMTS); IP Multimedia Subsystem (IMS); Stage 2 (3GPP TS 23.228 version 5.6.0 Release 5); ETSI TS 123 228", ETSI Standards, European Telecommunications Standards Institute, Sophia-Antipo, FR, vol. 3-SA2, No. V560, Sep. 2002 (Sep. 2002), XP-014007876, pp. 50-53.

"Digital Cellular Telecommunications Systems (Phase 2+); Universal Mobile Telecommunications System (UMTS); Numbering, Addressing and Identification (3GPP TS 23.003 version 5.4.0 Release 5); ETSI TS 123 003", ETSI Standards, European Telecommunications Standards Institute, Sophia-Antipo, FR, vol. 3-CN3;3-CN4, No. V540, Sep. 2002 (Sep. 2002), XP-014007384, pp. 21-23.

* cited by examiner

ENHANCED QOS CONTROL

CROSS REFERENCE TO RELATED APPLICATION

This application claims the benefit of the filing date of U.S. Provisional Application Ser. No. 60/413,877, filed Sep. 27, 2002, entitled "Enhanced QoS Control".

BACKGROUND OF THE INVENTION

1. Field of the Invention

The present invention relates to wireless communications. In particular, the present invention relates to control of the Quality of Service (QoS) for wireless communications.

2. Description of the Prior Art

Conventional wireless communication networks suffer from the problem of static, limited traffic classification capability. FIG. 1 shows a network having a plurality of application provider networks (APNs) 100-1 to 100-n connected to a Gateway GPRS Service Node (GGSN) 440 through respective QoS controls 110-1 to 110-n. Communication services are provided to terminals 160 through corresponding radio access networks 150 and Service GPRS Service Nodes 130. The radio access networks 150 may be R99 compliant GPRS networks including a base station system or 3GPP R99/R4 compliant WCDMA radio access networks. A Home Location Register (HLR) 140 contains one QoS profile for each APN 100.

At least some of terminals 160 are likely to be unable to make any QoS request, or to make a QoS request for different communication services. Thus, the communications services cannot depend on a traffic class based classification from the terminals 160. Instead, the network applies the same HLR based QoS control for all services provided by a single APN and is not able to give differentiated treatment for Wireless Application Protocol (WAP) browsing and Multimedia Media Messaging Service (MMS) from the same APN even if HLR 140 can set the maximum QoS profile per traffic class. Such a static HLR based control is not service-aware and has disadvantages. It is not possible to achieve differentiated treatment for different types of service usage within one traffic class and the network is sufficient only for short-term simple communication services.

The $3^{rd}$ Generation Partnership Project (3GPP) has attempted to provide for policy based admission control in Release 5 of their specifications. See www.3gpp.org. This specification includes a Policy Control Function (PCF), which although a separate logical entity from the Proxy Connection State Control Function (P-CSCF), is described as being a physical part of the P-CSCF in Release 5. FIG. 2 illustrates the implementation of the PCF as part of the P-CSCF 180. Consequently, policy based admission control is only available for communication services provided through the IP multimedia subsystem and only the IP multimedia subsystem may request resources of the radio access network (for example, GSM or UMTS) for the communication services. The Gateway GPRS Service Node (GGSN) 440 initiates policy requests at packet data protocol (PDP) context activation or modification. For QoS control of a PDP context, the PCF of the P-CSCF/Policy Control Function 180 sends an indication of the maximum allowable QoS to the GGSN 440, and the GGSN then sets a QoS (no higher than the maximum allowable QoS) for the PDP context.

The 3GPP TS 23.207 (V5.50 (2002-09) and TS 29.207 V5.1.0 (2002-09) describe the function of the PCF. These publications are incorporated herein by reference in their entirety.

The policy control procedure of 3GPP Release 5 of the PCF is described in more detail in FIG. 3. This policy control procedure comprises the following six steps:

1. A SIP message containing SDP payload is received by the P-CSCF 210. The Session Description Protocol (SDP) payload includes the session QoS related information such as media type and bit rate.
2. The PCF 220 is a decision point and authorizes the required QoS resources for the session and installs the IP bearer level policy based on information from the P-CSCF 210. The PCF 220 generates an authorization token and sends the token to the P-CSCF 210. Upon successful authorization of the session, the P-CSCF 210 forwards (the methodology is not illustrated, but is well known) the SDP payload to the UE 160 for the originating side, with the authorization token.
3. The UE 160 sends an Activate (Secondary) PDP Context Request to the SGSN 130 with the UMTS QoS parameters. The UE 160 includes the Binding Information (authentication token and flow IDs) in the Activate PDP Context Request. The SGSN 130 sends the corresponding Create PDP Context Request to the GGSN 440.
4. The GGSN 440 sends a Common Open Policy Service Protocol (COPS) protocol REQ message with the Binding Information to the PCF 220 in order to obtain relevant policy information. The message includes a token and flow identification(s).
5. The PCF 220 sends a COPS decision (DEC) message back to the GGSN 440. A DEC message from the PCF 220 to the GGSN 440 contains decision objects. A Decision object shall include one of the following commands:
   NULL Decision (No configuration data available)
   Install (Admit request/Install configuration, Commit)
   Remove (Remove request/Remove configuration)
   These commands are used to: (a) Authorize QoS/Revoke QoS authorization for one or more IP flows (b) Control forwarding for one or more IP flows
6. The GGSN 440 maps IP flow based policy information into PDP context based policy information and uses the PDP context based policy information to accept the PDP activation request, and sends a Create PDP Context Response message back to SGSN 130. The SGSN 130 sends an Activate (Secondary) PDP Context Accept to UE 160.

The $3^{rd}$ Generation Partnership Project (3GPP) is currently developing Release 6 of their specifications, including enhanced policy based admission control. It has been proposed to separate the PCF 220 from P-CSCF 210 so that services other than those provided through the IP multimedia subsystem could benefit from the policy based admission control.

A method of providing services to user equipment in a communications network including a database storing subscriber information regarding users of the user equipment obtaining the services, a policy enforcement entity to which the user equipment is coupled to obtain connection to sessions and a policy decision entity which is coupled to the policy enforcement entity and to the database which determines policy governing the providing of the services from at least one network or server coupled to the policy decision entity, in accordance with the invention includes providing from the database to the policy decision entity the subscriber information regarding permitted conditions for the users to obtain the services; providing service provider information from the at least one network or server regarding the services offered to the user equipment, which is utilized by the policy decision entity; and forming policy rules at the policy decision entity based upon the subscriber information and the service information; and wherein a requesting user equipment transmits a request for a session to the communications network which is processed by the policy decision entity in accordance with the policy rules to determine if a session is to be allowed and if the session is allowed determining characteristics of the service to be provided to the requesting user equipment and the policy enforcement entity enforces at least one characteristic of an allowed session upon the communication network to insure that the allowed session obtained by the requesting user equipment has the at least one characteristic of the allowed session. The policy decision entity may be a policy control function. The policy enforcement entity may be a Gateway General Packet Radio Access Node (GGSN). The subscriber information may comprise allowed services which may be provided to the user equipment by the at least one network or server. The allowed services may be defined by a service name, a quality of service class and a bit rate at which the requested session is provided to the requesting user equipment by the at least one network or server. The subscriber information may comprise allowed services which may be provided to the user equipment by the at least one network or server. The list of services may include a service name, quality of service class and an allowed bit rate is processed by the policy decision entity as part of forming the policy rules. The service information may comprise quality of service information. The quality of service information may comprise bandwidth. The service information may comprise quality of service information. The policy rules may be default policy rules when the subscriber information is not available which is not dependent upon information the varies with different subscribers. The communications may be a packet switched network.

A system for controlling the providing of service to user equipment in accordance with the invention includes a communication system including a database storing subscriber information regarding subscription of users of the user equipment to obtain sessions of the services, a policy enforcement entity to which the user equipment is coupled to obtain the services, and a policy decision entity which is coupled to the policy enforcement entity and to the database; and at least one network or server which is coupled to the policy decision entity that provides the sessions of the services to the user equipment through the policy decision entity; and wherein the at least one network or server provides service information to the policy decision entity regarding the sessions of the services which are offered to the user equipment, the database provides the stored subscriber information to the policy decision entity regarding subscription of the users of the user equipment to obtain the sessions of the services provided by the at least one network or server, the policy decision entity formulates policy rules defining characteristics of the sessions which may be obtained by users of the user equipment from the at least one network or server in response to the subscriber information and the service information and the policy enforcement entity in response to the policy rules enforces the obtaining of the sessions of the services by the user equipment through the wireless system in accordance with at least one characteristic. The policy decision entity may be a policy control function. The policy enforcement entity may be a Gateway General Packet Radio Access Node (GGSN). The characteristics may comprise a name of service, quality of service and a bit rate of the session to be provided to a requesting user equipment. The subscriber information may comprise allowed services which may be provided to the user equipment. The allowed services may be defined by information including a service name, a quality of service class and a bit rate at which the requested session is provided to the requesting user equipment. The service information may comprise quality of service information. The communications network may be a packet switched network.

In a system for controlling the providing of services to user equipment comprising a communication system including a policy enforcement entity to which the user equipment is coupled to obtain the services, and a policy decision entity which is coupled to the policy enforcement entity and to a database, and at least one network or server which is coupled to the policy decision entity that provides the services to the user equipment through the policy enforcement entity, an entity in accordance with the invention includes a database in the communication system which stores subscriber information regarding subscription of users of the user equipment to obtain the services from the at least one network or server; and wherein the at least one network or server provides service information to the policy decision entity regarding the services which are offered to the user equipment, the database provides the stored subscriber information to the policy decision entity regarding subscription of the users of the user equipment to obtain the services provided by the at least one network or server, the policy decision entity formulates policy rules defining characteristics of the services which may be obtained by users of the user equipment from the at least one network or server in response to the subscriber information and the service information and the policy enforcement entity in response to the policy rules enforces the obtaining of the services by the user equipment through the system in accordance with at least one characteristic. The policy decision entity may be a policy control function. The policy enforcement entity may be a Gateway General Packet Radio Access Node (GGSN). The characteristics may comprise a name of service, quality of service and a bit rate of the session to be provided to a requesting user equipment. The subscriber information may comprise allowed services which may be provided to the user equipment. The allowed services may be defined by information including a service name, a quality of service class and a bit rate at which the requested session is provided to the requesting user equipment. The service information may comprise quality of service information. The quality of service information may comprise bandwidth. The communications system may be a packet switched network.

In a communications system including a policy enforcement entity to which user equipment is coupled to obtain connection to services and a policy decision entity which is coupled to the policy enforcement entity which determines policy governing the providing of the services from at least one network or server coupled to the policy decision entity, wherein service information is provided from at least one network or server, regarding service offered by the at least one network or server to the user equipment, which is utilized by the policy decision entity to formulate, policy rules based upon subscriber information and the service information, and a requesting user equipment transmits a request for a service with at least one of the at least one network or server which is processed in accordance with the policy rules to determine if the service is to be allowed and if the service is allowed determining characteristics of the service to be provided to the requesting user equipment and the policy enforcement entity enforces at least one characteristic of an allowed service upon the communication network to insure that the allowed service obtained by the requesting user equipment has the at least one characteristic of the allowed service, a method in accordance with the invention includes providing from a database to the policy decision entity the subscriber information regarding permitted conditions for the user equipment to obtain the service which is used by the policy decision entity as part of the formulation of the policy rules; and providing services to the user equipment in accordance with the at least one characteristic of the allowed service. The policy decision entity may be a policy control function. The policy enforcement entity may be a Gateway General Packet Radio Access Node (GGSN). The subscriber information may comprise allowed services which may be provided to the user equipment by the at least one network or server. The allowed services may be defined by a service name, a quality of service class and a bit rate at which the requested session is provided to the requesting user equipment by the at least one network or server. The subscriber information may comprise allowed services which may be provided to the user equipment by the at least one network or server. The requests for services may be transmitted to the policy enforcement entity and from the policy enforcement entity to the policy decision entity; and wherein an identification and an access point name of the at least one network or server from which the service is requested may be transmitted to the policy decision entity and to a system, including the database, which in response thereto transmits a list of services allowed to be provided to the requesting user equipment. The service information may comprise quality of service information. The quality of service information may comprise bandwidth. The requests for services may be transmitted to the policy enforcement entity and from the policy enforcement entity to the policy enforcement entity; and an identification and an access point name of the at least one network or server from which the service is requested may be transmitted to the policy decision entity and to a system, including the database, which in response thereto transmits a list of services allowed to be provided to the requesting user equipment. The communications system may be a packet switched network.

BRIEF DESCRIPTION OF THE DRAWINGS

Like reference numerals identify like parts throughout the drawings.

DETAILED DESCRIPTION OF THE PREFERRED EMBODIMENTS

Figure 1:
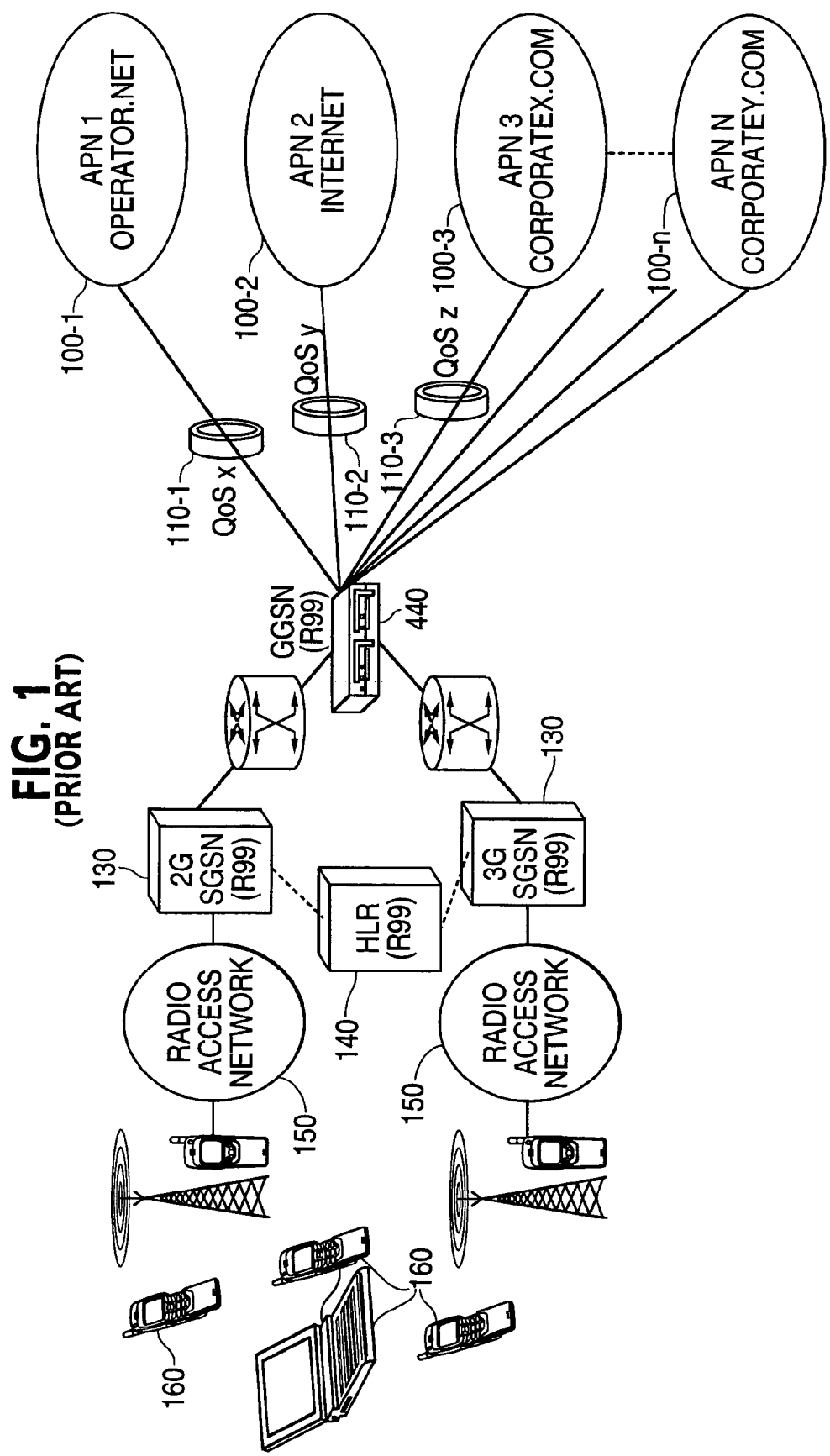
FIG. 1 illustrates QoS control problems in a prior art wireless communication network.
Figure 2:
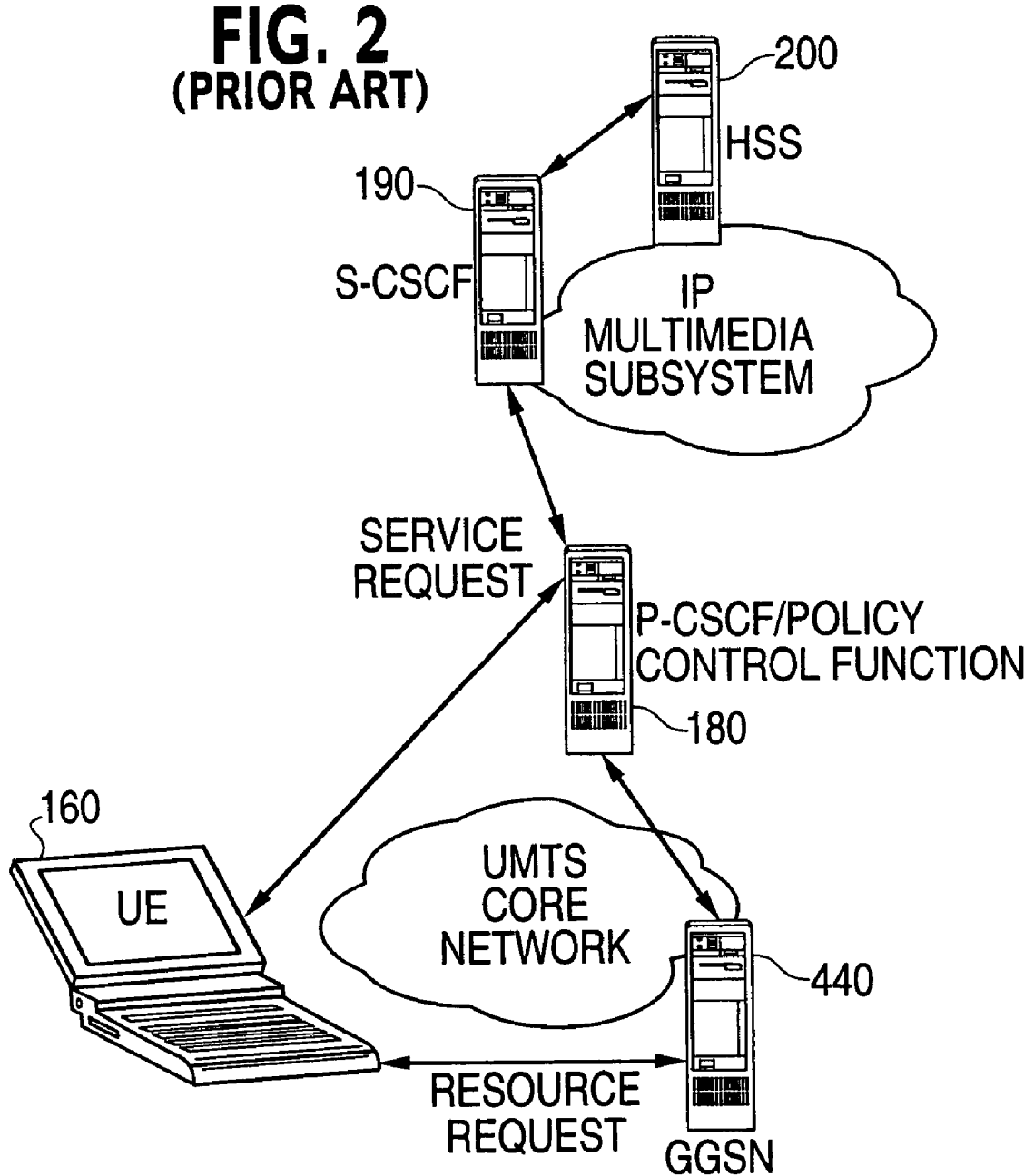
FIG. 2 illustrates the implementation of a policy control function in a prior art wireless communication network according to 3GPP Release 5.
Figure 3:
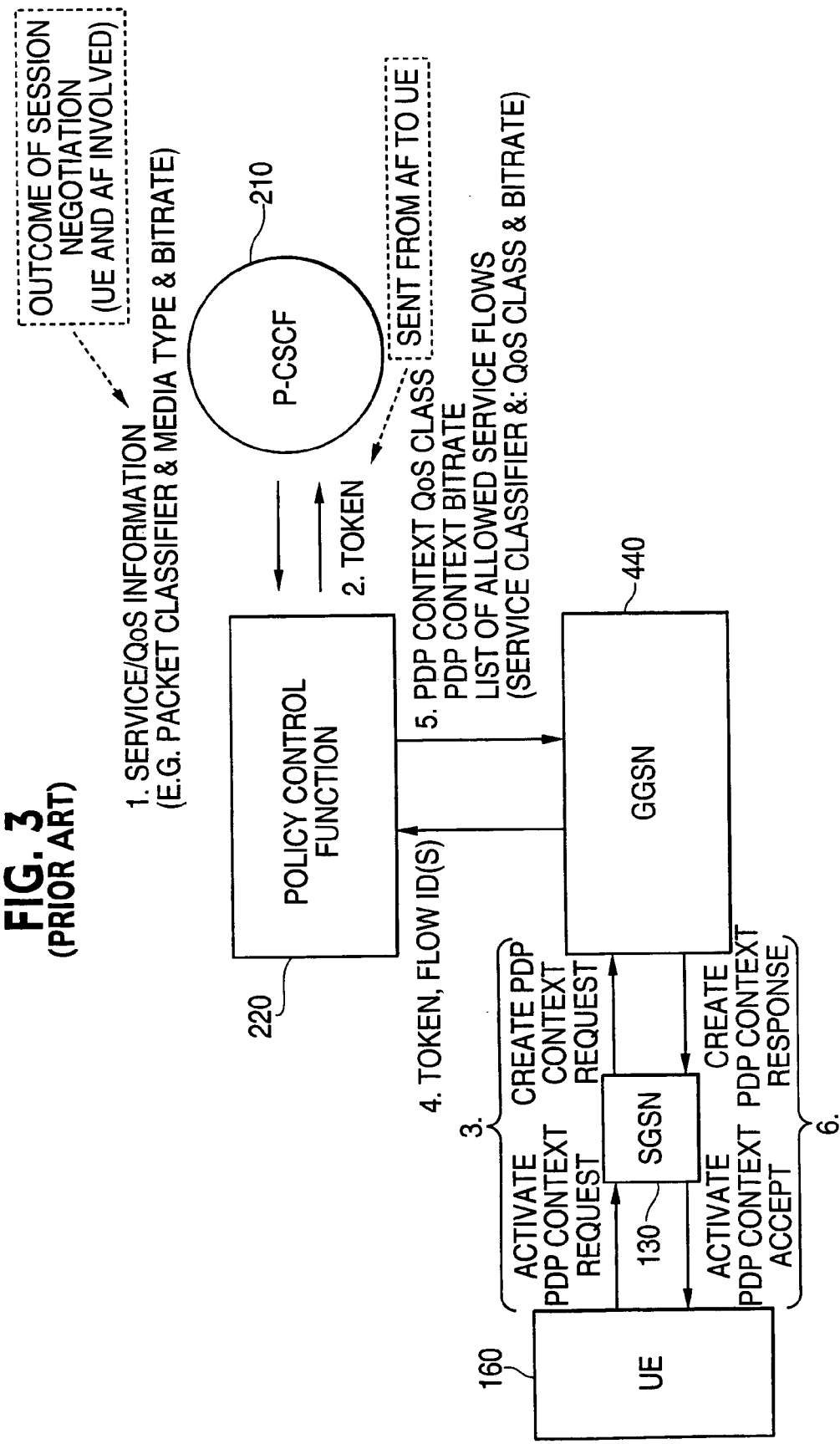
FIG. 3 illustrates a detailed flow diagram of the prior art policy control control procedure of 3GPP Release 5.
Figure 4:
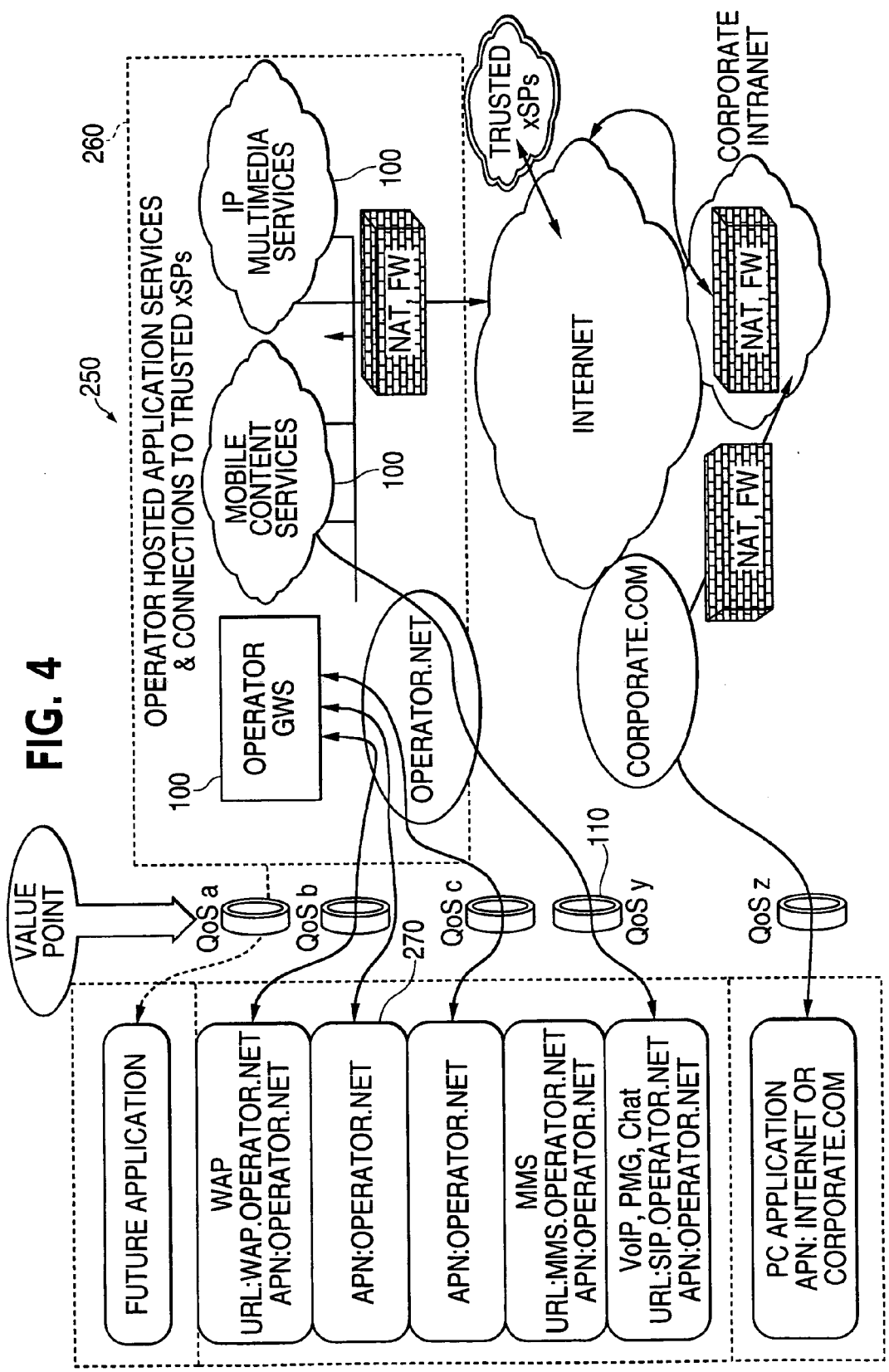
FIG. 4 illustrates an embodiment of network controlled QoS in accordance with the invention providing different exemplary communication services.

This invention provides policy based admission QoS control of different networks or servers providing services. An embodiment 250 of implementation of the policy based admission QoS control in accordance with the invention is illustrated in FIG. 4. Unlike the prior art network illustrated in FIG. 1, the fully network controlled QoS in FIG. 4 provides separate QoS controls for a collective group 260 of networks or servers in a packet switched network even if individual networks or servers 100 are provided from the same operator. The network or servers 100 are either service provider networks or service provider servers of diverse designs. The QoS controls 110 are preferably enabled within one APN operator 270 making offering multimedia service combinations simple, terminal realizations simple, and providing consistent treatment of the same service over all of the vendor's terminals. Preferably, the QoS controls 110 can be hidden from the end user, are always linked to the offered services and are always part of the user service selection and the user receives what was purchased.

Figure 5:
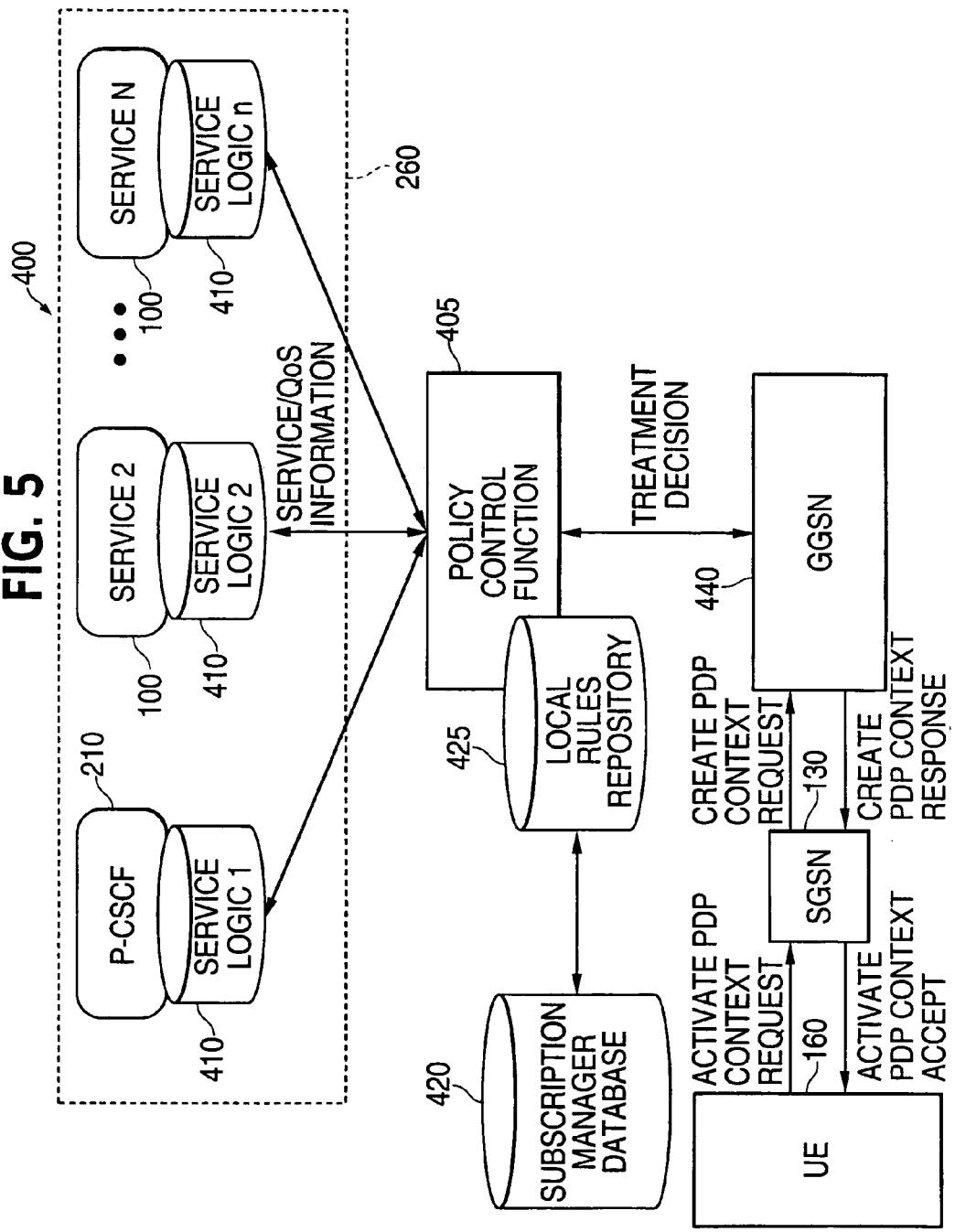
FIG. 5 illustrates an embodiment of the invention enabling operators to dynamically allocate QoS according to service need and business potential.

An embodiment 400 of the invention, which enables operators to dynamically allocate QoS according to service need and business potential, is illustrated in FIG. 5. Subscription Manager Database 420 is connected to PCF 405 which functions as the policy decision point/entity. The PCF 405 may be in accordance with the 3GPP TS which are referred to above. The PCF 405 decides what QoS treatment to allocate, binding of service and PDP context. From the subscription manager database 420, PCF 405 receives subscriber information, which may include subscriber specific information networks or servers 100 providing services to the UE 160, to which the subscriber subscribes to obtain access (for example, streaming services with a maximum bandwidth "X") to the services. The service logic 410 provides service information from the networks or servers 100, including the identification of services and QoS to PCF 405. The PCF 405 formulates policy rules based upon the subscriber and subscription information provided from the subscription manager database 420 and the service information provided from the at least one network or servers 100 providing service to the UE 160 and/or from the service logic 410. The local rules repository 425 stores default policy information in the form of decision logic. If the subscriber information is somehow absent from the subscription manager database 420, default policy rules may be applied. The default policy rules do not vary in dependence upon different customers requesting service.

Preferably, the GGSN 440 initiates policy based admission control by sending a request to the PCF 405. This may happen either at PDP context activation, at PDP context modification, or when the GGSN 440 notices that a new flow is introduced in the user plane. In order to identify a new flow in the user plane, the GGSN 440 stores information on existing flows, such as source and destination IP addresses, source and destination ports, and protocol. The GGSN 440 also may filter user plane traffic and understand when user plane traffic does not match any of the existing flows.

The PCF 405 receives a request from the GGSN 440 and decides what QoS treatment to allocate to the PDP context or flow. For the decision, the PCF 405 may use service/QoS information received from the service logic 410 (for example, service logic 1 associated with the P-CSCF 210) involving for example, the outcome of a SDP negotiation), subscriber specific information received from the subscription manager database 420 and static information configured in the PCF 405 (for example, priority of streaming traffic in the operator's network). Any or all of this information may be stored in local repository 425 of the PCF 405. The PCF 405 also provides binding of service and PDP context.

The PCF 405 sends a decision on the QoS treatment to the GGSN 440. The QoS treatment may include maximum values for QoS attributes or target values for QoS attributes. The GGSN 440 functions as the policy enforcement point entity in the wireless network (not illustrated) which provides connectivity to the UE 160. The GGSN 440 enforces the QoS policy treatment decision based upon the policy rules set by the PCF received from PCF 405. Based on the treatment decision, the GGSN 440 may downgrade or upgrade the QoS requested for the PDP context or flow.

Figure 6:
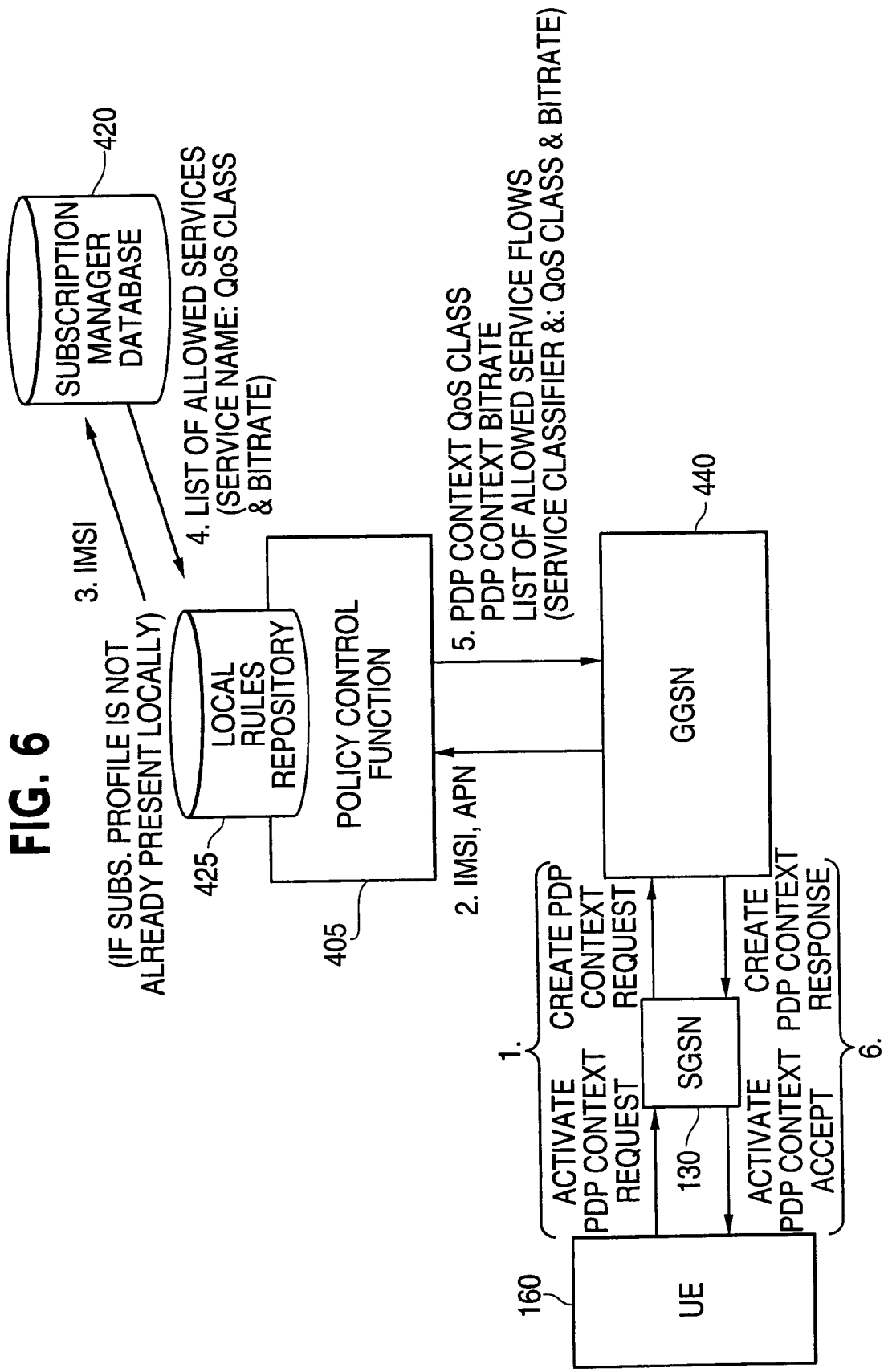
FIG. 6 describes the control procedure for a primary PDP context setup when the user equipment has not established any communication with at least one network or server providing services.
Figure 7:
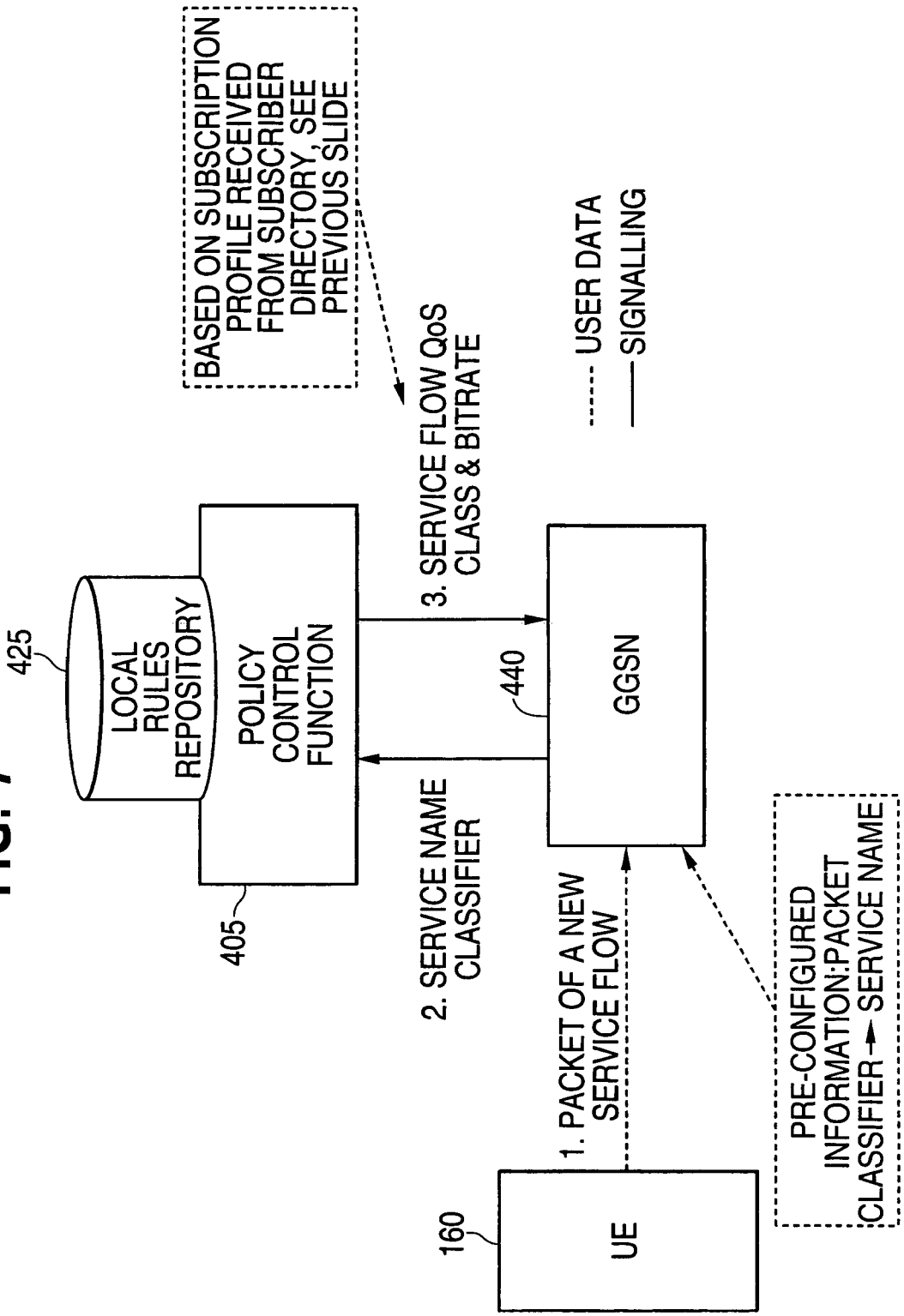
FIG. 7 illustrates the control procedure of a detected new flow in an existing PDP context.
Figure 8:
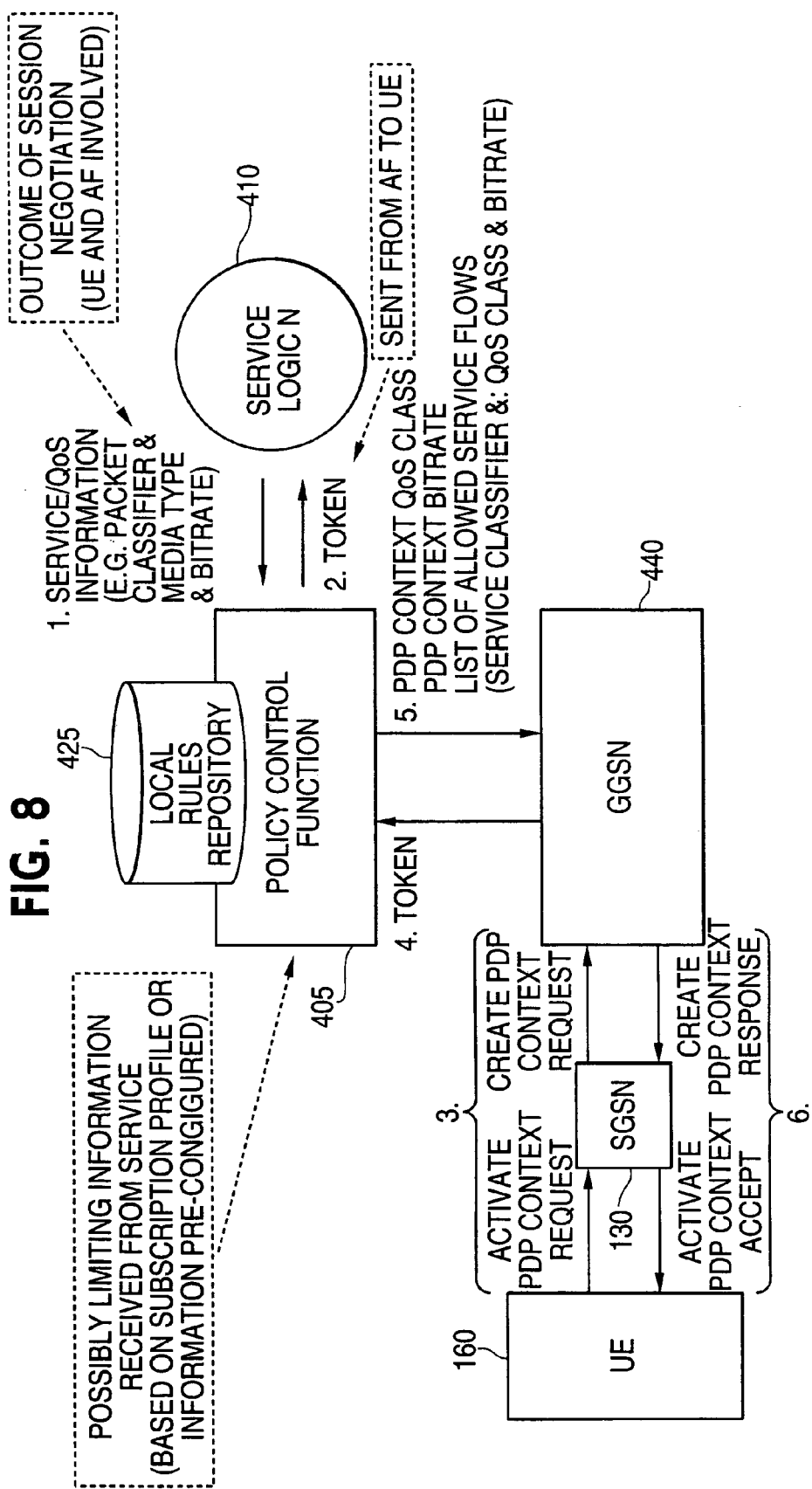
FIG. 8 illustrates the control procedure when the PCF and a service logic associated with a network or server providing services exchange information prior to applying and/or updating policy.

Policy control examples of the invention are described in conjunction with FIGS. 6–8. FIG. 6 illustrates the control procedure for a primary PDP context setup where the user has not yet established any communication with a service provider network or server 100; FIG. 7 illustrates the control procedure for a detected new flow in the existing PDP context; and FIG. 8 describes the control procedure when the PCF 405 and the service logic 410 exchange information prior to applying and/or updating.

The control procedure of FIG. 6 has six steps:
1. The UE 160 sends an Activate (primary) PDP Context message to the SGSN 130 with the UMTS QoS parameters. The SGSN 130 validates the request against PDP context subscription records earlier received from the HLR (not illustrated in FIG. 6, but may be in accordance with FIG. 1). The SGSN 130 may downgrade the QoS Requested. The SGSN 130 sends the corresponding Create PDP Context message to the GGSN 440.
2. The GGSN 440 sends a COPS REQ message with the Binding Information to the PCF 400 in order to obtain relevant policy information. The binding information used here includes the Subscriber identity (IMSI) and the accessed Access Point Name (APN). In the backbone network of the wireless system, the APN is a reference to the GGSN to be used. In addition the APN may, in the GGSN, identify the network or server 100 to be used to provide service to the UE 160 and optionally, a service to be offered.
APN as defined in 3GPP TS 23.003, which is incorporated by reference herein in its entirety and is not a limitation of the present invention, is described as follows:
The APN Network Identifier is mandatory and is a label (for example "corporation" or "service") or a set of labels separated by dots, which is a fully qualified domain name according to the DNS naming conventions (for example "company.com" or "service.company.com"). In order to guarantee the uniqueness of the APN, the packet-domain public land mobile network should allocate, to an ISP or corporation, an APN Network Identifier identical to their domain name in the public Internet. The APN Network Identifier shall not end with ".gprs". An APN Network Identifier of 3 or more labels and that starts with a Reserved Service Label, or an APN Network Identifier that consists of a Reserved Service Label alone, indicates that for the APN a GGSN supports additional services such as external PDN address allocation or Mobile IP support. Reserved Service Labels, e.g., "dhcp" or "MIPv4FA", and the corresponding services that they stand for, e.g., external PDN address allocation via DHCP, or Mobile IP Foreign Agent support, are to be agreed upon among operators.

The APN Operator Identifier is optional. It is a fully qualified domain name according to the DNS naming conventions, and consists of three labels. The APN Operator Identifier shall end in ".gprs". For example, it may be "MNCyyy.MCCzzzz.gprs". The exact format is defined in 3G TS 29.060. The APN stored in the HLR shall not contain the APN Operator Identifier. A wild card may be stored in the HLR instead of the APN. This wild card indicates that the user may select an APN that is not stored in the HLR. The use of the wild card is described in Annex A.

3. The PCF 400 may retrieve subscription data from the Subscription Manager Database 420, if the information is not already present locally in the local rules repository 425. It should be noted that the subscription data represents information about each subscription that a subscriber has for receiving service sessions from the APNs 100 as illustrated for example in FIG. 5. Each subscriber, who is a user of the UE 160, may have multiple subscriptions each defining different service parameters. The PCF 405 uses the Subscriber identity provided by the GGSN 440 for this purpose. Additionally, PCF 405 may also use the accessed network or server 100 to search for more specific subscription data.
4. The subscription data stored in the Subscription Manager Database 420 includes for each subscription allowed services for the given subscriber, and QoS class and bitrate information.
5. Based on subscription information, as well as the rules stored locally in the local rules repository 425 of the PCF 405, the PCF makes the treatment decision to be allocated. The PCF 405 sends a COPS DEC message back to the GGSN 440. A Decision (DEC) message from the PCF 405 to the GGSN 440 contains decision objects. A Decision object includes the PDP context QoS class and bit rates, a list of allowed services to be carried by the PDP context, and the QoS class and bit rates for each service.
6. The GGSN 440 uses the PDP context based policy information to accept the PDP activation request, and sends a Create PDP Context Response message back to SGSN 130. The GGSN 440 may propose new UMTS QoS attributes, based on the policy decision. The SGSN 136 sends an Activate (Secondary) PDP Context Accept message to UE 160.

The procedure of FIG. 7 has three steps:
1. The GGSN 440 detects a new flow from UE 160 in the user plane of an on-going PDP context that requires policy control. To make this happen, the GGSN 440 contains the pre-configured information of classifiers which, for example, are source and destination IP addresses, source and destination ports, and protocol.

2. The GGSN 440 associates the flow with the service which is described by the service name. The GGSN 440 sends a COPS REQ message with the Binding Information to the PCF 405 in order to obtain relevant policy information used for formulating the policy rules. The binding information used here includes the service name and/or the classifier.
3. Based on subscription information, the policy rules stored locally in the local repository 430 in the PCF 405, and the communication with the relevant Service Provider Networks 100 prior to this point of time, the PCF makes a new treatment decision to be allocated. The PCF 405 sends a COPS DEC message back to the GGSN 440. The GGSN 440 enforces the authorization decision and may modify the QoS requested for the PDP context or flow.

The procedure of FIG. 8 has six steps:
1. The PCF 405 receives, such as through service logic 410 associated with P-CSCF 210 of FIG. 5, the QoS related information (for example, media type and bit rate) of a service provided to the UE from the particular network or server (not illustrated).
2. The PCF 405 authorizes the required QoS resources for the session based jointly on subscription and service information as previously described, local rules, and optionally, any default rules when applicable. For example, the PCF 405 may limit the bit rate to be used by the service. The PCF 405 generates an authorization token and sends this to the P-CSCF (not illustrated). Upon successful authorization of the session, the P-CSCF (not illustrated) forwards the SDP payload to the UE 160 for the originating side, with the authorization token.
3. The UE 160 sends an Activate (Secondary) PDP Context to the SGSN 130 with the UMTS QoS parameters. The UE 160 includes the Binding Information (authentication token and flow IDs) in the Activate PDP Context. The SGSN 130 sends the corresponding Create PDP Context to the GGSN 440.
4. The GGSN 440 sends a COPS REQ message with the Binding Information (authorization token and flow Ids) to the PCF 405 in order to obtain relevant policy information.
5. The PCF 405 binds the REQ with the policy decision. The PCF 405 sends a COPS DEC back to the GGSN 440. A Decision (DEC) from the PCF 405 to the GGSN 440 contains decision objects. A Decision object includes the PDP context QoS class and bit rates, a list of the allowed services flows to be carried by the PDP context, and the QoS class and bit rates for each service flow.
6. The GGSN 440 uses the PDP context based policy information to accept the PDP activation request, and sends a Create PDP Context Response back to SGSN 130. The SGSN 130 sends an Activate (Secondary) PDP Context Accept to UE 160.

Figure 9:
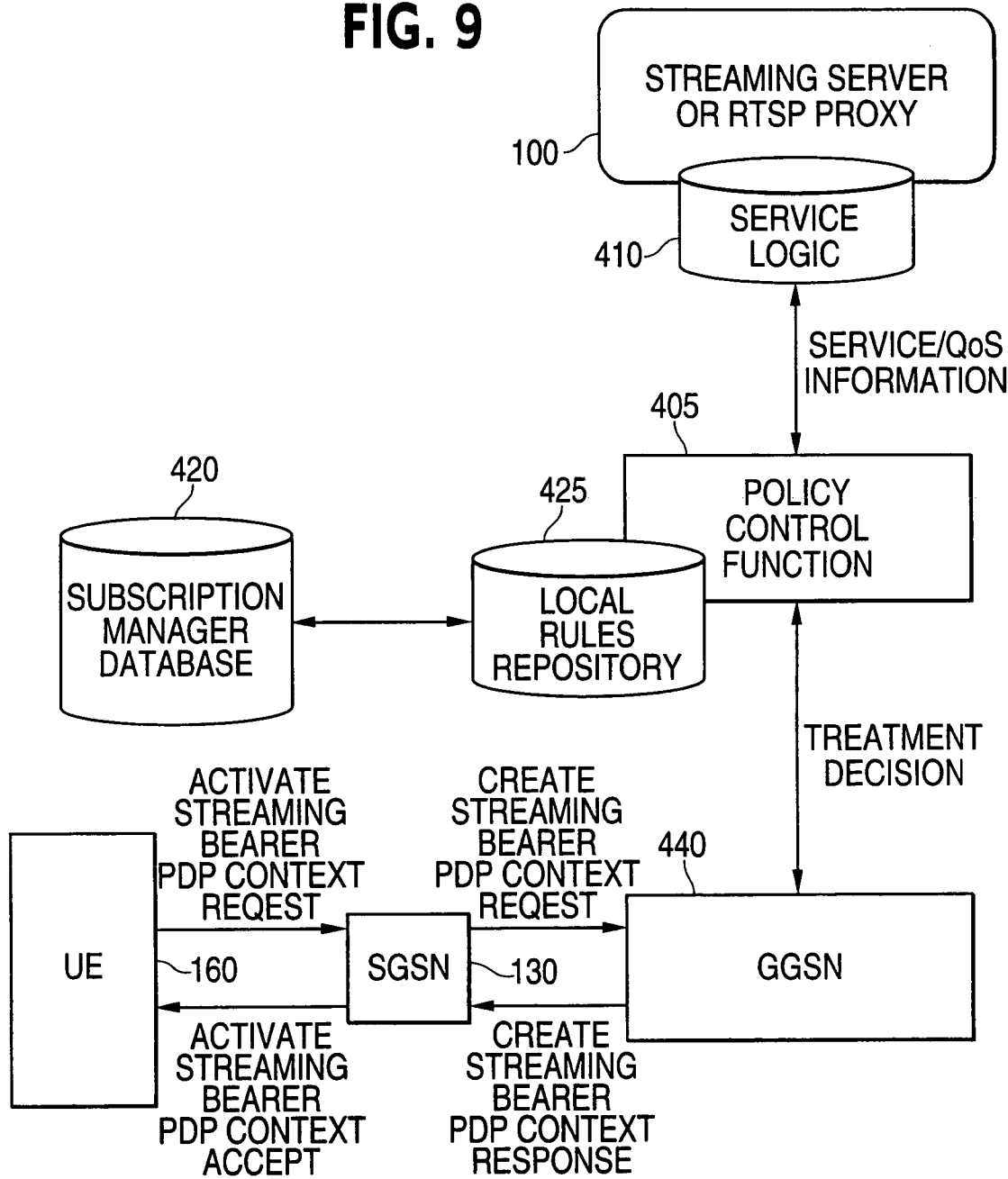
FIG. 9 is an example of the invention enabling QoS control over a streaming communication service.

FIG. 9 is an example which enables QoS control over a streaming communication service. A streaming bearer PDP context request is passed between GGSN 440 and terminal 160. PCF 405 functions as described above and provides binding of the streaming session with the streaming bearer PDP context, etc. The Service Logic 410 of the streaming server or RTSP proxy 100 decides what QoS information to provide based on SDP.

This embodiment enables QoS control on a per session basis, as well as static service subscriptions based upon policy rules determined from consideration of the subscriber information and service provider information. It also ensures that the bearer only carries authorized traffic and, for example, the user can not use the streaming bearer to carry email traffic.

Figure 10:
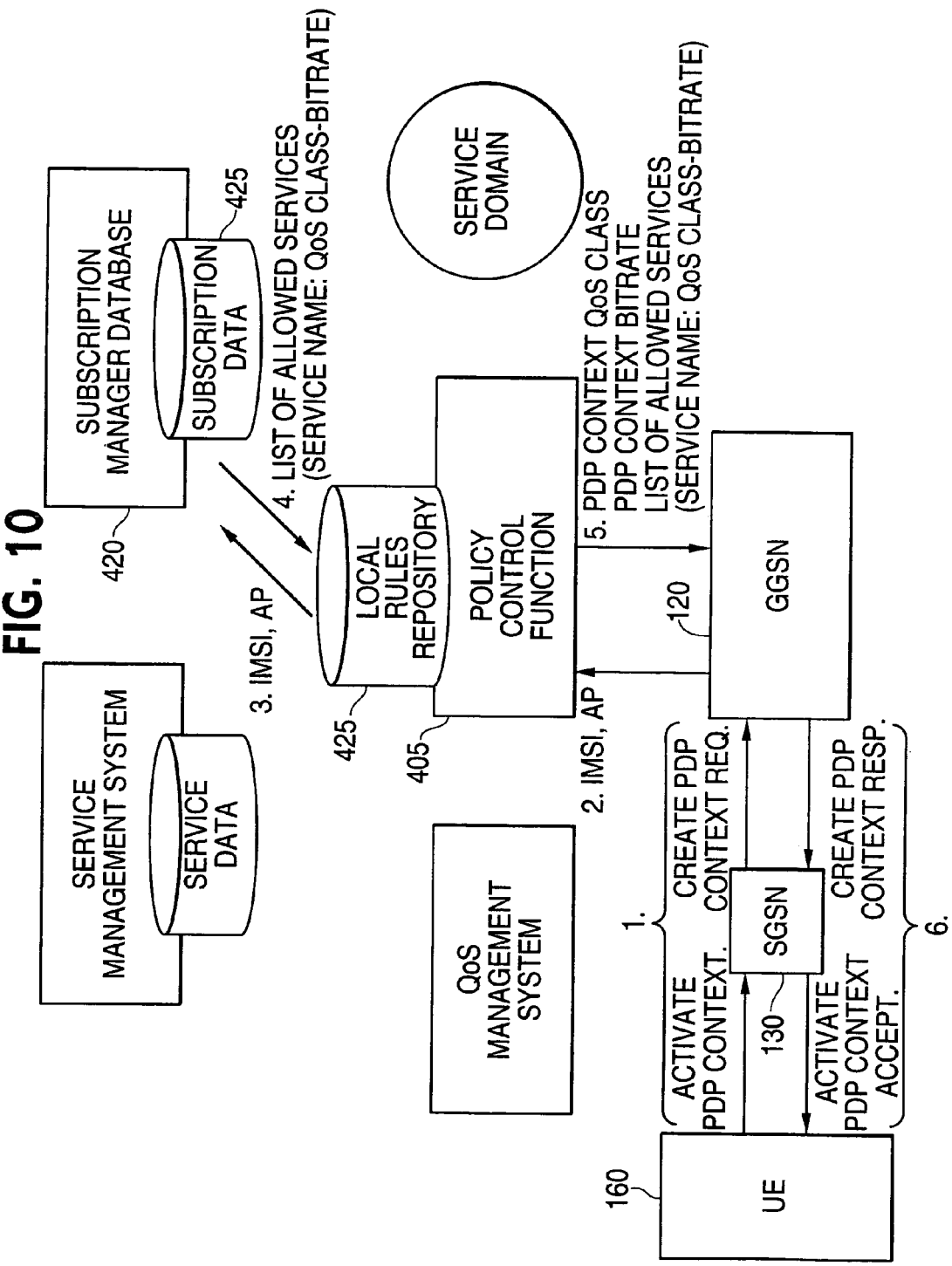
FIG. 10 illustrates the process of obtaining information from the subscription manager database which is used to define a quality of service provided to a requesting user equipment.

FIG. 10 illustrates the process of obtaining subscriber information from the subscription manager database 420 based upon the IMSI and APN provided through the PCF 405. The PCF 405 creates the PDP context class, bitrate, list of allowed services including service name which is stored in the local rules repository and passed to the GGSN 440.

There are numerous advantages provided by the embodiments of the invention. One single architecture can be used to control QoS allocation to all the traffic of different service usage and user service selection/subscription. QoS allocation may be combined with session QoS information dynamically. The invention enables the network to offer differentiated treatment of interactive and background traffic in a controlled and consistent manner. There is better control resolution compared to traffic class based static subscription control from a HLR, but backwards compatibility with the conventional HLR is provided. This solution also interworks well with multi-vendor radio access networks 150, since it utilizes the UMTS QoS bearer architecture and standard PDP context negotiation procedures. This enables the QoS policy enforcement not only in the GGSN 440 but also throughout the mobile network.

The invention achieves the following:
1. Enabling differentiation: Differentiation between individual subscribers, services and providers can be achieved via admission control and QoS negotiation leading to classification of the generated traffic. The classification then results in different kind of prioritization of the traffic in the network and hence, impacts to the probability of the service maintaining best possible quality level. This architecture enables QoS differentiation based on user selected services as well as the business potentials of different services.
2. Enabling centralized policy decision functions: The key value of this invention is to enforce operator business logic, that is to enable the utilization of mobile network resource according to the business priority of different customers and services. This architecture supports a centralized policy decision function at the mobile network edge, and more specifically, enables the mapping of business importance of user traffic into relevant GPRS bearer QoS attribute(s), and consequently enable the radio access network to handle the traffic according to the right priority.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A method of providing services to user equipment, the method comprising:
   providing from a database to a policy decision entity, subscriber information regarding permitted conditions for users to obtain the services;
   providing service provider information from at least one network or server regarding the services offered to the user equipment, which is utilized by the policy decision entity; and
   forming policy rules at the policy decision entity based upon the subscriber information and service information; and wherein a requesting user equipment transmits a request for a session to a communications network which is processed by the policy decision entity in accordance with the policy rules to determine if a session is to be allowed and if the session is allowed determining characteristics of the service to be provided to the requesting user equipment and the policy enforcement entity enforces at least one characteristic of an allowed session upon the communication network to insure that the allowed session obtained by the requesting user equipment has the at least one characteristic of the allowed session, wherein the communications network includes a database storing subscriber information regarding users of the user equipment obtaining the services, a policy enforcement entity to which the user equipment is coupled to obtain connection to sessions and the policy decision entity which is coupled to the policy enforcement entity and to the database which determines policy governing the providing of the services from at least one network or server coupled to the policy decision entity.

2. A method in accordance with claim 1 wherein: the policy decision entity is a policy control function.

3. A method in accordance with claim 1 wherein: the policy enforcement entity is a Gateway General Packet Radio Access Node (GGSN).

4. A method in accordance with claim 1 wherein: the subscriber information comprises allowed services which may be provided to the user equipment by the at least one network or server.

5. A method in accordance with claim 4 wherein:
the allowed services are defined by a service name, a quality of service class and a bit rate at which the requested session is provided to the requesting user equipment by the at least one network or server.

6. A method in accordance with claim 2 wherein: the subscriber information comprises allowed services which may be provided to the user equipment by the at least one network or server.

7. A method in accordance with claim 6 wherein:
the allowed services are defined by a service name, a quality of service class and a bit rate at which the requested session is provided to the requesting user equipment by the at least one network or server.

8. A method in accordance with claim 3 wherein: the subscriber information comprises allowed services which may be provided to the user equipment by the at least one network or server.

9. A method in accordance with claim 8 wherein:
the allowed services are defined by a service name, a quality of service class and a bit rate at which the requested session is provided to the requesting user equipment by the at least one network or server.

10. A method in accordance with claim 1, further comprising;
transmitting the requests for sessions to the policy enforcement entity and from the policy enforcement entity to the policy decision entity; and
transmitting an identification and an access point name of the at least one network or server from which the session is requested to the policy decision entity and to a system including the database, which in response thereto transmits a list of services allowed to be provided to the requesting user equipment.

11. A method in accordance with claim 10 wherein:
the list of services includes a service name, quality of service class and an allowed bit rate is processed by the policy decision entity as part of forming the policy rules.

12. A method in accordance with claim 4 wherein; the service information comprises quality of service information.

13. A method in accordance with claim 12 wherein: the quality of service information comprises bandwidth.

14. A method in accordance with claim 5 wherein; the service information comprises quality of service information.

15. A method in accordance with claim 14 wherein: the quality of service information comprises bandwidth.

16. A method in accordance with claim 6 wherein; the service information comprises quality of service information.

17. A method in accordance with claim 16 wherein: the quality of service information comprises bandwidth.

18. A method in accordance with claim 7 wherein; the service information comprises quality of service information.

19. A method in accordance with claim 18 wherein: the, quality of service information comprises bandwidth.

20. A method in accordance with claim 4, further comprising wherein;
transmitting the requests for sessions to the policy enforcement entity and from the policy enforcement entity to the policy decision entity; and
transmitting an identification and an access point name of the at least one network or server from which the session is requested to the policy decision entity and to a system including database, which in response thereto transmits a list of services allowed to be provided to the requesting user equipment.

21. A method in accordance with claim 5, further comprising:
transmitting the requests for sessions to the policy enforcement entity and from the policy enforcement entity; and
transmitting an identification and an access point name of the at least one network or server from which the session is requested to the policy decision entity and to a system including the database, which in response thereto transmits a list of services allowed to be provided to the requesting user equipment.

22. A method in accordance with claim 11, further comprising:
transmitting the requests for sessions to the policy enforcement entity and from the policy enforcement entity; and
transmitting an identification and an access point name of the at least one network or server from which the session is requested to the policy decision entity and to a system including the database, which in response thereto transmits a list of services allowed to be provided to the requesting user equipment.

23. A method in accordance with claim 12, further comprising:
requests for sessions are transmitted to a policy enforcement entity and from the policy enforcement entity; and
an identification and an access point name of the at least one network or server from which the session is requested is transmitted to the policy decision entity and to a system, including a database, which in response thereto transmits a list of services allowed to be provided to the requesting user equipment.

24. A system for controlling the providing of service to user equipment, the system comprising:
a communication system including a database storing subscriber information regarding subscription of users of the user equipment to obtain sessions of the services, a policy enforcement entity to which the user equipment is coupled to obtain the services, and a policy decision entity which is coupled to the policy enforcement entity and to the database; and
at least one network or server which is coupled to the policy decision entity that provides the sessions of the services to the user equipment through the policy decision entity; and wherein
the at least one network or server provides service information to the policy decision entity regarding the sessions of the services which are offered to the user equipment, the database provides the stored subscriber information to the policy decision entity regarding subscription of the users of the user equipment to obtain the sessions of the services provided by the at least one network or server, the policy decision entity formulates policy rules defining characteristics of the sessions which may be obtained by users of the user equipment from the at least one network or server in response to the subscriber information and the service information and the policy enforcement entity in response to the policy rules enforces the obtaining of the sessions of the services by the user equipment through the wireless system in accordance with at least one characteristic.

25. A system in accordance with claim 24 wherein: the policy decision entity is a policy control function.

26. A system in accordance with claim 24 wherein: the policy enforcement entity is a Gateway General Packet Radio Access Node (GGSN).

27. A system in accordance with claim 24 wherein: the characteristics comprise a name of service, quality of service and a bit rate of the session to be provided to a requesting user equipment.

28. A system in accordance with claim 25 wherein: the characteristics comprise a name of service, quality of service and a bit rate of the session to be provided to a requesting user equipment.

29. A system in accordance with claim 26 wherein: the characteristics comprise a name of service, quality of service and a bit rate of the session to be provided to a requesting user equipment.

30. A system in accordance with claim 24 wherein: the subscriber information comprises allowed services which may be provided to the user equipment.

31. A system in accordance with claim 30 wherein:
the allowed services are defined by information including a service name, a quality of service class and a bit rate at which the requested session is provided to the requesting user equipment.

32. A system in accordance with claim 30 wherein: the service information comprises quality of service information.

33. A system in accordance with claim 32 wherein: the quality of service information comprises bandwidth.

34. A system in accordance with claim 31 wherein: the service information comprises quality of service information.

35. A system in accordance with claim 34 wherein: the quality of service information comprises bandwidth.

36. An entity for controlling the providing of services to user equipment, the entity comprising:
a database which stores subscriber information regarding subscription of users of the user equipment to obtain the services from at least one network or server; and
the at least one network or server provides service information to policy decision entity regarding the services which are offered to the user equipment, the database provides the stored subscriber information to a policy decision entity regarding subscription of the users of the user equipment to obtain the services provided by the at least one network or server, the policy decision entity formulates policy rules defining characteristics of the services which may be obtained by users of the user equipment from the at least one network or server in response to the subscriber information and the service information and the policy enforcement entity in response to the policy rules enforces the obtaining of the services by the user equipment through the system in accordance with at least one characteristic,
wherein in a system for controlling the providing of services to user equipment comprising a communication system including the policy enforcement entity to which the user equipment is coupled to obtain the services, and the policy decision entity which is coupled to the policy enforcement entity and to the database, and at least one network or server which is coupled to the policy decision entity that provides the services to the user equipment through the policy enforcement entity.

37. An entity in accordance with claim 36 wherein: the policy decision entity is a policy control function.

38. An entity in accordance with claim 36 wherein: the policy enforcement entity is a Gateway General Packet Radio Access Node (GGSN).

39. An entity in accordance with claim 36 wherein: the characteristics comprise a name of service, quality of service and a bit rate of the session to be provided to a requesting user equipment.

40. An entity in accordance with claim 37 wherein: the characteristics comprise a name of service, quality of service and a bit rate of the session to be provided to a requesting user equipment.

41. An entity in accordance with claim 38 wherein: the characteristics comprise a name of service, quality of service and a bit rate of the session to be provided to a requesting user equipment.

42. An entity in accordance with claim 36 wherein: the subscriber information comprises allowed services which may be provided to the user equipment.

43. An entity in accordance with claim 42 wherein:
the allowed services are defined by information including a service name, a quality of service class and a bit rate at which the requested session is provided to the requesting user equipment.

44. An entity in accordance with claim 42 wherein: the service information comprises quality of service information.

45. An entity in accordance with claim 44 wherein: the quality of service information comprises bandwidth.

46. An entity in accordance with claim 45 wherein: the service information comprises quality of service information.

47. An entity in accordance with claim 46 wherein: the quality of service information comprises bandwidth.

48. A method comprising:
  providing from a database to a policy decision entity, subscriber information regarding permitted conditions for user equipment to obtain a service which is used by the policy decision entity as part of a formulation of policy rules; and
  enforcing by the policy entity by providing the service to the user equipment in accordance with at least one characteristic of an allowed service
  wherein a communications system includes a policy enforcement entity to which user equipment is coupled to obtain connection to services and the policy decision entity which is coupled to the policy enforcement entity which determines policy governing the providing of the services from at least one network or server coupled to the policy decision entity, wherein service information is provided from at least one network or server, regarding service offered by the at least one network or server to the user equipment, which is utilized by the policy decision entity to formulate, policy rules based upon subscriber information and the service information, and a requesting user equipment transmits a request for a service with at least one of the at least one network or server which is processed in accordance with the policy rules to determine if the service is to be allowed and if the service is allowed determining characteristics of the service to be provided to the requesting user equipment and the policy enforcement entity enforces at least one characteristic of an allowed service upon the communication network to insure that the allowed service obtained by the requesting user equipment has the at least one characteristic of the allowed service.

49. A method in accordance with claim 48 wherein: the policy decision entity is a policy control function.

50. A method in accordance with claim 48 wherein: the policy enforcement entity is a Gateway General Packet Radio Access Node (GGSN).

51. A method in accordance with claim 48 wherein: the subscriber information comprises allowed services which may be provided to the user equipment by the at least one network or server.

52. A method in accordance with claim 51 wherein:
  the allowed services are defined by a service name, a quality of service class and a bit rate at which the requested session is provided to the requesting user equipment by the at least one network or server.

53. A method in accordance with claim 49 wherein:
  the subscriber information comprises allowed services which may be provided to the user equipment by the at least one network or server.

54. A method in accordance with claim 53 wherein:
  the allowed services are defined by a service name, a quality of service class and a bit rate at which the requested session is provided to the requesting user equipment by the at least one network or server.

55. A method in accordance with claim 50 wherein: the subscriber information comprises allowed services which may be provided to the user equipment by the at least one network or server.

56. A method in accordance with claim 55 wherein:
  the allowed services are defined by a service name, a quality of service class and a bit rate at which the requested session is provided to the requesting user equipment by the at least one network or server.

57. A method in accordance with claim 49, further comprising:
  transmitting the requests for services to the policy enforcement entity and from the policy enforcement entity to the policy decision entity; and
  transmitting an identification and an access point name of the at least one network or server from which the service is requested to the policy decision entity and to a system including the database, which in response thereto transmits a list of services allowed to be provided to the requesting user equipment.

58. A method in accordance with claim 51 wherein; the service information comprises quality of service information.

59. A method in accordance with claim 58 wherein: the quality of service information comprises bandwidth.

60. A method in accordance with claim 52 wherein; the service information comprises quality of service information.

61. A method in accordance with claim 60 wherein: the quality of service information comprises bandwidth.

62. A method in accordance with claim 53 wherein; the service information comprises quality of service information.

63. A method in accordance with claim 62 wherein: the quality of service information comprises bandwidth.

64. A method in accordance with claim 54 wherein; the service information comprises quality of service information.

65. A method in accordance with claim 64 wherein: the quality of service information comprises bandwidth.

66. A method in accordance with claim 51, further comprising:
  transmitting the requests for services to the policy enforcement entity and from the policy enforcement entity; and
  transmitting an identification and an access point name of the at least one network or server from which the service is requested to the policy decision entity and to a system including the database, which in response thereto transmits a list of services allowed to be provided to the requesting user equipment.

67. A method in accordance with claim 52, further comprising:
  transmitting the requests for services are transmitted to the policy enforcement entity and from the policy enforcement entity; and
  transmitting an identification and an access point name of the at least one network or server from which the service is requested to the policy decision entity and to a system including the database, which in response thereto
  transmits a list of services allowed to be provided to the requesting user equipment.

68. A method in accordance with claim 58, further comprising:
  transmitting the the requests for services to the policy enforcement entity and from the policy enforcement entity; and
  transmitting an identification and an access point name of the at least one network or server from which the service is requested, to the policy decision entity and to a system including the database, which in response thereto transmits a list of services allowed to be provided to the requesting user equipment.

69. A method in accordance with claim 1 wherein:
the policy rules are default policy rules when the subscriber information is not available which is not dependent upon information the varies with different subscribers.

70. A method in accordance with claim 1 wherein: the communications network is a packet switched network.

71. A system in accordance with claim 24 wherein: the communications network is a packet switched network.

72. An entity in accordance with claim 36 wherein:
the communications network is a packet switched network.

73. A method in accordance with claim 48 wherein:
the communications network is a packet switched network.

\* \* \* \* \*